US012463488B2

(12) United States Patent
Chambrion et al.

(10) Patent No.: US 12,463,488 B2
(45) Date of Patent: Nov. 4, 2025

(54) COIL COMPONENT HAVING A CLOSURE ELEMENT WITHOUT DIRECT CONTACT TO THE CARRIER; AND ELECTRIC MACHINE

(71) Applicant: Schaeffler Technologies AG & Co. KG, Herzogenaurach (DE)

(72) Inventors: Martin Chambrion, Erstein (FR); Michael Marsetz, Ettlingen (DE); Johannes Dollansky, Bühlertal (DE); Cédric Blaes, Munchhausen (FR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 235 days.

(21) Appl. No.: 18/019,306

(22) PCT Filed: Jul. 21, 2021

(86) PCT No.: PCT/DE2021/100631
§ 371 (c)(1),
(2) Date: Feb. 2, 2023

(87) PCT Pub. No.: WO2022/033627
PCT Pub. Date: Feb. 17, 2022

(65) Prior Publication Data
US 2023/0336046 A1 Oct. 19, 2023

(30) Foreign Application Priority Data
Aug. 11, 2020 (DE) .......................... 102020121057.4

(51) Int. Cl.
*H02K 3/48* (2006.01)
*H02K 3/34* (2006.01)
*H02K 3/487* (2006.01)

(52) U.S. Cl.
CPC ............. *H02K 3/487* (2013.01); *H02K 3/345* (2013.01)

(58) Field of Classification Search
CPC ........... H02K 3/345; H02K 3/48; H02K 3/487
(Continued)

(56) References Cited

U.S. PATENT DOCUMENTS

| 10,044,241 | B2* | 8/2018 | Nakatake | ............... H02K 3/487 |
| 2012/0293037 | A1* | 11/2012 | Uchida | ................ H02K 3/487 |
| | | | | 310/214 |

(Continued)

FOREIGN PATENT DOCUMENTS

| CN | 207926308 | 9/2018 |
| CN | 209516775 | 10/2019 |

(Continued)

OTHER PUBLICATIONS

Kim et al., English Machine Translation of KR1020020001947A (Year: 2002).*

*Primary Examiner* — Rashad H Johnson
(74) *Attorney, Agent, or Firm* — Volpe Koenig

(57) ABSTRACT

A coil component for an electric machine, having a carrier and a coil winding accommodated in the carrier at least in sections. The carrier has a ring region with multiple grooves distributed in a circumferential direction, and multiple winding sections of the coil winding are received in each groove. An insulation layer is arranged between the carrier and the winding sections in at least one groove and projects with two extension portions over the winding sections towards a radial opening of the at least one groove. A closure element is received in the carrier in the groove with the insulation layer towards the radial opening, and both extension portions are arranged such that the closure element is spaced (Continued)

apart from the carrier by the extension portions. An electric machine is provided with the coil component.

19 Claims, 2 Drawing Sheets

(58) Field of Classification Search
USPC .......................................................... 310/214
See application file for complete search history.

(56) References Cited

U.S. PATENT DOCUMENTS

| | | | | |
|---|---|---|---|---|
| 2016/0072352 | A1* | 3/2016 | Lee ........................ | H02K 3/522 |
| | | | | 310/214 |
| 2019/0207460 | A1* | 7/2019 | Iwaki ..................... | H02K 15/13 |
| 2020/0220438 | A1* | 7/2020 | Ide ........................ | H02K 3/345 |
| 2021/0328471 | A1* | 10/2021 | Böckenhoff ............. | H02K 1/30 |
| 2023/0318386 | A1* | 10/2023 | Hashimoto ............ | H02K 15/13 |
| | | | | 310/214 |
| 2023/0336046 | A1* | 10/2023 | Chambrion ............ | H02K 3/345 |
| 2024/0396395 | A1* | 11/2024 | Suzuki ................... | H02K 3/325 |

FOREIGN PATENT DOCUMENTS

| | | |
|---|---|---|
| DE | 19526509 | 1/1997 |
| DE | 10357987 | 7/2004 |
| DE | 102006003498 | 8/2007 |
| KR | 1020020001947 | 1/2002 |

* cited by examiner

COIL COMPONENT HAVING A CLOSURE ELEMENT WITHOUT DIRECT CONTACT TO THE CARRIER; AND ELECTRIC MACHINE

CROSS-REFERENCE TO RELATED APPLICATIONS

This application is the U.S. National Phase of PCT Appln. No. PCT/DE2021/100631, filed Jul. 21, 2021, which claims the benefit of German Patent Appln. No. 102020121057.4, filed Aug. 11, 2020, the entire disclosures of which are incorporated by reference herein.

TECHNICAL FIELD

The disclosure relates to a coil component, which is implemented either as a stator or a rotor, for an electric machine, comprising a carrier and a coil winding which is received in the carrier at least in sections, wherein the carrier has a ring region with multiple grooves distributed in a circumferential direction, and wherein multiple winding sections of the coil winding are embedded in each groove, and wherein furthermore an insulation layer is arranged between the carrier and the winding sections in at least one groove, which insulation layer projects with two extension portions over the winding sections towards a radial opening of the at least one groove. Furthermore, the disclosure relates to an electric machine comprising such a coil component.

BACKGROUND

Generic components, such as those used as rotors or stators, are already well known from the prior art. In this context, for example, CN 209 51 67 75 U and CN 207 92 63 08 U disclose components with insulation layers between the winding sections and the carrier.

In principle, there is a requirement to reliably insulate the coil winding from the carrier so as not to adversely affect the functioning of the electric machine. In the case of known coil components, however, it has been found that malfunctions can occur when higher voltages are applied due to undesired creep effects occurring between the winding sections and the carrier. This is caused in particular by the fact that the current creepage distances are too short for higher voltages. Furthermore, it has been found that insulation of the winding sections used in known designs is subject to a certain amount of material abrasion both during assembly and during operation. This can even lead to the insulation no longer having the intended insulating effect.

SUMMARY

It is therefore the object of the present disclosure to provide a coil component, the components of which are decoupled/insulated from one another as reliably as possible even during operation with higher performance parameters.

According to the disclosure, this is achieved in that in the at least one groove provided with the insulation layer, a closure element is received in the carrier in a form-fitting manner towards the radial opening, wherein the two extension portions are designed and arranged in such a manner that the closure element is (held/supported) spaced apart from the carrier.

The closure element provides a groove closure wedge that creates the greatest possible creepage distance between the winding sections and the carrier. As a result, the coil component is designed for higher voltages. Due to the direct arrangement of the insulation layer between the receiving point of the carrier and the closure element, unintentional material abrasion on the closure element is also avoided during assembly. The result is that the closure element is received in the carrier in the correct position both during assembly and throughout operation.

Further embodiments are explained in more detail below and recited in the claims.

Accordingly, it is also advantageous if the carrier is provided with a receiving contour on each circumferential side of the at least one groove and the closure element is pushed into the receiving contours with its respective circumferential flank region (and consequently supported in the radial direction and in the circumferential direction in a form-fitting manner), with one of the two extension portions being interposed. As a result, the closure element is received in the carrier as stably as possible, while at the same time the assembly can be performed while incurring significantly less wear.

Furthermore, it is advantageous if the at least one groove has a coil receiving space receiving the winding sections, wherein the groove does not fall below a width of the coil receiving space over its entire radial extension. As a result, the coil component is also prepared for a radial winding method in a skillful manner, which means that the amount of required assembly work can be reduced.

It has also proven to be expedient if the closure element is made from a softer material than the carrier. As an alternative to this, it is also possible to design the carrier to be softer than the closure element, at least in the region of the receiving contours. The provision of the insulation layer between the closure element and the carrier always ensures that the closure element is assembled with as little damage as possible.

It is also advantageous if the closure element is provided with a chamfer towards an axial end. As a result, the closure element can be pushed into the groove in the axial direction with as little damage as possible to the insulation layer or the carrier. The chamfer preferably extends completely around a front edge in the circumferential direction of the closure element.

In addition, it is expedient if the two extension portions project beyond the closure element on a radial side facing away from the winding sections. This further improves the insulating effect of the insulation layer.

The disclosure also relates to an electric machine for a motor vehicle drive, having a stator and a rotor which can be rotated relative to the stator, wherein the stator or the rotor is designed as a coil component according to at least one of the previously described embodiments.

In other words, a coil component, preferably designed as a stator, is provided, which is equipped with a wound coil arrangement (coil winding), groove insulation (insulating paper/insulation layer) and a groove wedge (closure element). The groove wedge is decoupled/separated from the base body of the stator/laminated core of the stator (carrier) by means of the groove insulation. Consequently, a groove closure wedge concept without (direct) contact with a stator laminated core (carrier) is implemented. The groove insulation prevents the formation of abrasion particles while the groove wedge is being pushed in/threaded in. The groove insulation is preferably not preformed/prepunched in a contact region with the groove wedge. This means that the groove insulation does not assume the form of a receiving contour/guiding contour until the groove wedge is threaded in. A chamfer is provided at one end of the groove wedge to keep the threading forces low.

BRIEF DESCRIPTION OF THE DRAWINGS

The disclosure will now be explained in more detail below with reference to figures, in which context various exemplary embodiments are also illustrated.

In the figures.

DETAILED DESCRIPTION

The drawings are only schematic in nature and serve only for understanding the disclosure. The same elements are provided with the same reference symbols.

Figure 1:
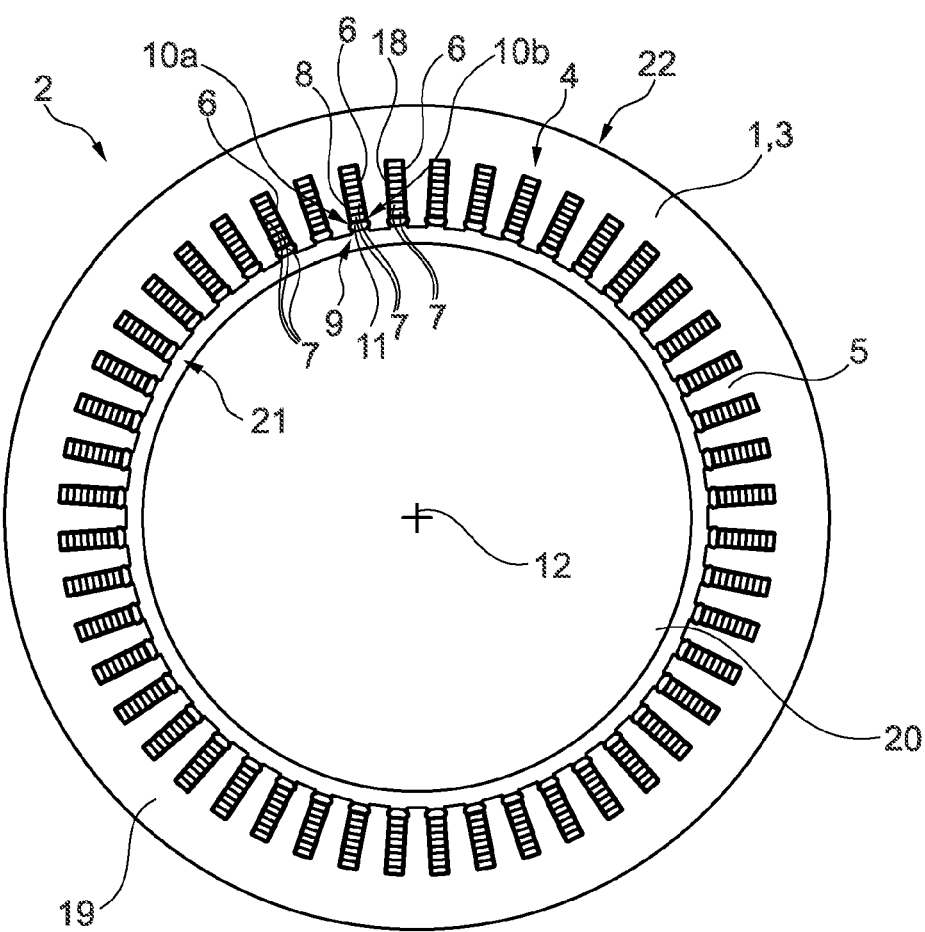
FIG. 1 shows a cross-sectional view of an electric machine, shown in simplified form, having a coil component according to the disclosure, designed as a stator, according to a preferred exemplary embodiment.

FIG. 1 first shows a basic structure of an electric machine 2 with a coil component 1 according to the disclosure. The electric machine 2 is preferably used as a drive machine of a hybrid or purely electric motor vehicle.

The electric machine 2 has a stator 19 and a rotor 20 which is arranged to be rotatable relative to the stator 19 and is illustrated in a greatly simplified manner for the sake of clarity. In this embodiment, the stator 19 is realized directly by the coil component 1 according to the disclosure. In this context, it should be pointed out that in further embodiments, the rotor 20 is also designed as the coil component 1 as an alternative to this.

For the sake of completeness, it should be noted that the directional information used below, namely the terms "axial/axial direction", "radial/radial direction" and "circumferential direction", should be viewed in relation to an axis of rotation 12 of rotor 20. An axial direction thus corresponds to a direction along the axis of rotation 12 extending into the image plane in FIG. 1, a radial direction corresponds to a direction perpendicular to the axis of rotation 12, and a circumferential direction corresponds to a direction along a circle line extending coaxially to the axis of rotation 12.

As can be seen in FIG. 1, the coil component 1 has a plurality of grooves 6 distributed in the circumferential direction. The grooves 6 extend in the radial direction and in this embodiment are open radially inwards/towards a radial inner side 21 of the coil component 1 (through opening 9). In further embodiments, the grooves 6 are also alternatively open radially outwards/towards a radial outer side 22 of the coil component 1.

The grooves 6 are made in a ring region 5 of a carrier 3 of the coil component 1. The carrier 3 is formed by a laminated core. The carrier 3 thus has a plurality of sheet metal segments stacked one on top of the other in the axial direction, which together form the carrier 3. The grooves 6 extend in the axial direction over the entire length of the carrier 3 and thus penetrate each sheet metal segment. The grooves 6 are preferably formed as punched or cut recesses.

In addition to the carrier 3, the coil component 1 has a coil winding 4, which can be seen in cross-section according to FIG. 1 with regard to several winding sections 7 in the individual grooves 6. As can also be clearly seen in FIG. 3, each winding section 7 in this exemplary embodiment is designed so wide that it approximately occupies the width of the groove 6 measured in the circumferential direction. The winding sections 7 are arranged in a row in the radial direction. In this embodiment 6, six winding sections 7 are arranged one above the other as an example. The winding sections 7 are received in a so-called coil receiving space 18 of the respective groove 6. That coil receiving space 18 has a constant width over its radial extension (extension in the circumferential direction). In particular, it can also be seen that the groove 6 does not fall below the width of the coil receiving space 18 over its entire radial extension. The winding sections 7 are consequently preferably wound radially.

An insulation layer 8 is used between the winding sections 7 in the respective groove 6 in order to decouple the coil winding 4/the winding sections 7 from the carrier 3. This insulation layer 8 is implemented, for example, as what is known as insulating paper. The insulating paper is in turn a material that consists of cellulose, polymers or mixtures of both materials in the usual way, in the form of a laminate.

Viewed in cross-section, the insulation layer 8 has an essentially U-shaped profile and is in contact with an inner side of the groove 6. In the fully assembled state, the insulation layer 8 is consequently inserted between the inner side of the groove 6 and the group of winding sections 7 in order to decouple the winding sections 7 from the carrier 3 in the radial direction and in the circumferential direction.

The insulation layer 8 is therefore in contact with the carrier 3 on two opposite circumferential sides 13a, 13b of the groove 6 in the circumferential direction. The insulation layer 8 is also in contact with the carrier 3 on a side radially opposite the opening 9 of the groove 6, here the radial outer side 22. The insulation layer 8 continues to extend along the entire axial length of the carrier 3.

Figures 4, 5:
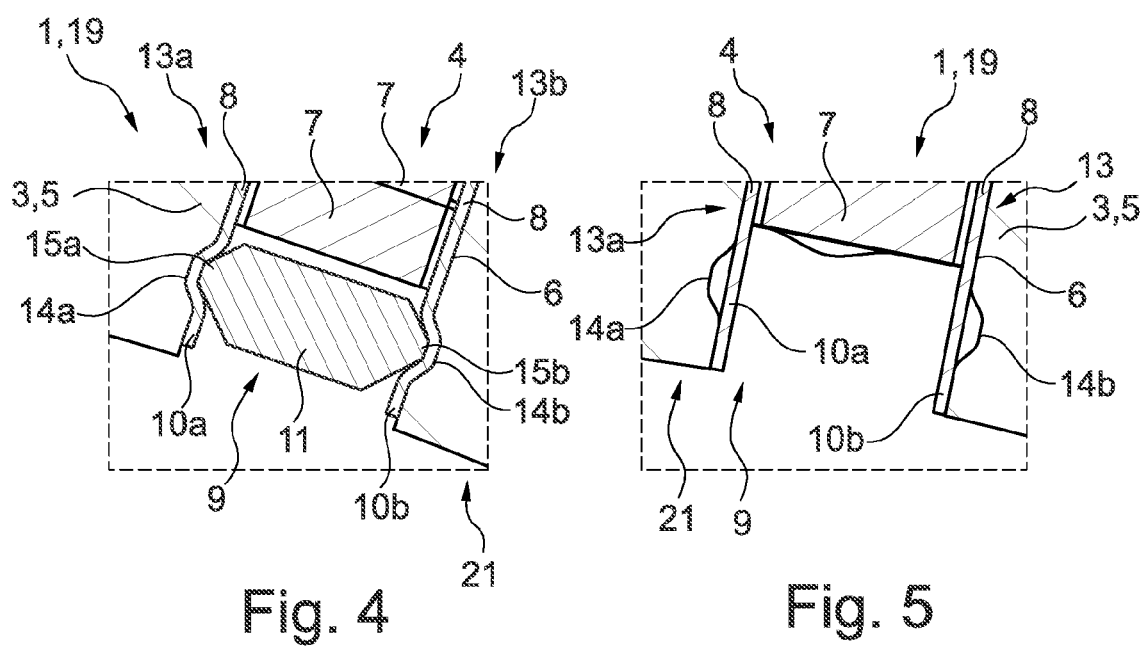
FIG. 4 shows a detailed view of one of the grooves shown in FIG. 3 in the region of a closure element.
FIG. 5 shows a detailed view of the groove already shown in FIG. 4 prior to assembly of the closure element.

As can finally be seen in FIGS. 4 and 5, the groove 6 is provided with receiving contours 14a, 14b on a radial inner side of the winding sections 7 and spaced apart from the winding sections 7 (/a radially innermost winding section 7). A first receiving contour 14a is introduced towards the first circumferential side 13a; a second receiving contour 14b is introduced towards a second circumferential side 13b opposite the first circumferential side 13a. The receiving contours 14a, 14b are essentially realized as mirror-symmetrical and are used to receive a closure element 11 in a form-fitting manner.

Figure 3:
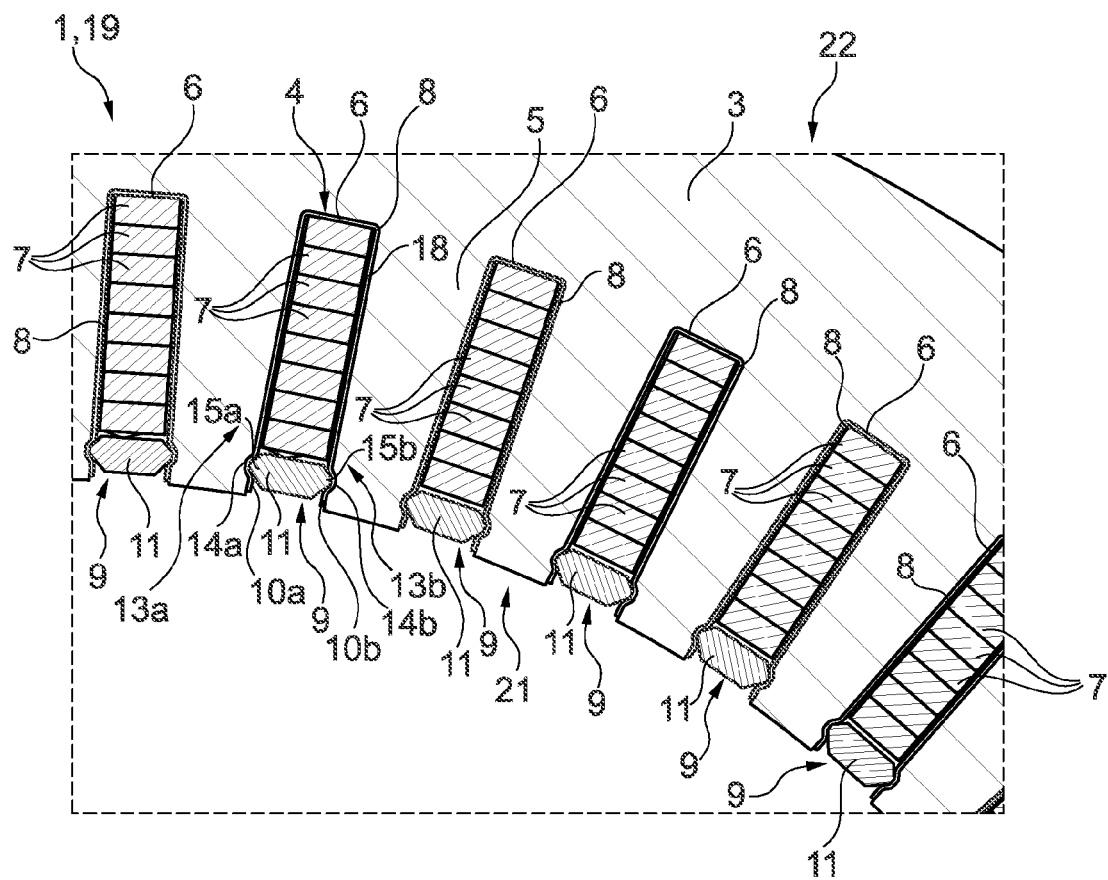
FIG. 3 shows a detailed view of a cross-sectional area of the coil component to illustrate a plurality of grooves spaced apart from one another in the circumferential direction and the closure elements received therein.

It can also be seen in FIGS. 3 and 4 that the insulation layer 8 projects inwards in a targeted manner in the radial direction beyond the winding sections 7 in such a manner that two extension portions 10a, 10b opposite one another in the circumferential direction project radially inwards beyond the winding sections 7. A first extension portion 10a is therefore formed towards the first circumferential side 13a and a second extension portion 10b is formed towards the second circumferential side 13b.

Before the closure element 11 is pushed in, the insulation layer 8 has the extension shown in FIG. 5. It can be seen that the extension portions 10a, 10b project radially beyond the receiving contours 14a, 14b and also extend further to a side of the receiving contours 14a, 14b that is radially facing away from the winding sections 7. Since the groove 6 does not fall below the width of the coil receiving space 18 over its entire radial extension, the extension portions 10a, 10b extend straight in the radial direction beyond the receiving contours 14a, 14b.

Finally, it can be seen in FIG. 4 that the closure element 11 arranged according to the disclosure is received in a form-fitting manner within the receiving contours 14a, 14b that are covered by the insulation layer 8. It can be seen that two flank regions 15a, 15b of the closure element 11 opposite one another in the circumferential direction are supported in the receiving contour 14a, 14b in a form-fitting manner with the insulation layer 8/the respective extension portion 10a, 10b being interposed. In this regard, the insulation layer 8 is in contact with the base of the receiving contours 14a, 14b in the circumferential direction. The first extension portion 10a is therefore arranged in the circumferential direction between the first receiving contour 14a and the first flank region 15a, while the second extension portion 10b is arranged in the circumferential direction between the second receiving contour 14b and the second flank region 15b. The receiving contours 14a, 14b extend in the circumferential direction into the carrier 3 to such an extent that the closure element 11 is thus reliably received in the radial direction in a form-fitting manner in the carrier 3 in the fully assembled state of the coil component 1.

Figure 2:
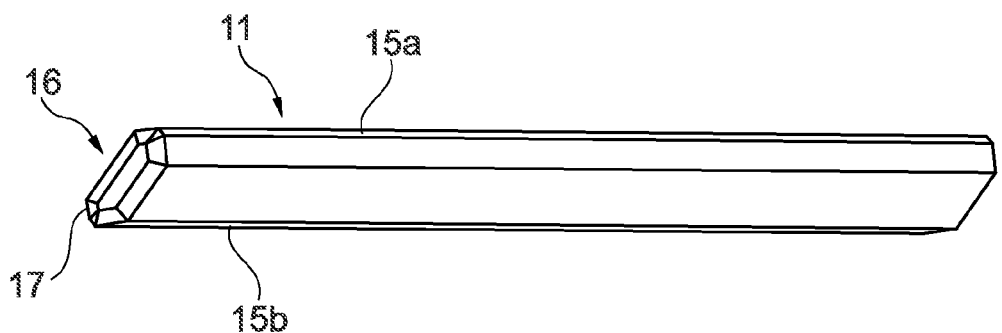
FIG. 2 shows a perspective view of a closure element used in FIG. 1 within a groove of a carrier.

As can also be seen in FIG. 2, the closure element 11 is essentially realized as I-shaped over its entire axial length. The closure element 11 is tapered essentially in the shape of a wedge/cone towards its circumferential flank regions 15a, 15b. The closure element 11 is consequently implemented as a groove closure wedge and is pushed axially into the groove 6 during assembly in such a manner that its two opposite flank regions 15a, 15b are each pushed into one of the two receiving contours 14a, 14b.

Furthermore, a chamfer 17 is provided on an axial end 16 of the closure element 11 for easier assembly of the closure element 11. This front chamfer 17 extends completely around a circumference of the closure element 11. When the closure element 11 is pushed in axially, the chamfer 17 automatically serves to fold the extension portions 10a, 10b over into the respective receiving contour 14a, 14b.

In other words, according to the disclosure, an embodiment of a stator 19 with a winding (coil winding 4), an insulating paper and a groove closure wedge (closure element 11), using which the wear of the groove closure wedge is eliminated, is implemented. The groove closure wedges are separated from the stator stack (carrier 3) by the insulating paper.

FIGS. 1 to 5 show the principle of the disclosure. The insulating paper "envelops" the groove closure wedges and prevents the formation of abrasion particles when the groove closure wedges are threaded in. The insulating paper does not necessarily have to be pre-stamped in the region of contact with the groove closure wedge (FIG. 5). This means that the insulating paper only assumes the shape of the guide track (receiving contour 14a, 14b) after the groove closure wedge has been threaded in. The design of the paper is very advantageous because the geometry is simple and not very sensitive to tolerances. A chamfer 17 is present at the end 16 of the groove closure wedge so that the threading force remains low.

LIST OF REFERENCE SYMBOLS

1 Coil component
2 Electric machine
3 Carrier
4 Coil winding
5 Ring region
6 Groove
7 Winding section
8 Insulation layer
9 Opening
10a First extension portion
10b Second extension portion
11 Closure element
12 Axis of rotation
13a First circumferential side
13b Second circumferential side
14a First receiving contour
14b Second receiving contour
15a First flank region
15b Second flank region
16 End
17 Chamfer
18 Coil receiving space
19 Stator
20 Rotor
21 Inner side
22 Outer side

The invention claimed is:

1. A coil component for an electric machine, the coil component comprising:
   a carrier;
   a coil winding received in the carrier at least in sections;
   the carrier has a ring region with multiple grooves distributed in a circumferential direction;
   multiple winding sections of the coil winding are received in each said groove;
   an insulation layer arranged between the carrier and the winding sections in at least one groove of the multiple grooves, the insulation layer projects with two extension portions over the winding sections in the at least one groove towards a radial opening of the at least one groove; and
   a closure element received in the carrier in the at least one groove provided with the insulation layer with a form fit towards the radial opening, both of the extension portions are configured such that the closure element is spaced apart from the carrier by the extension portions, and the closure element is holeless from a first axial end of the closure element to a second axial end of the closure element.

2. The coil component according to claim 1, wherein the carrier includes a receiving contour on each circumferential side of the at least one groove and the closure element is pushed into the receiving contours with a respective circumferential flank region thereof, with one of the two extension portions being interposed.

3. The coil component according to claim 1, wherein the at least one groove has a coil receiving space receiving the winding sections, and the groove does not fall below a width of the coil receiving space over an entire radial extension thereof.

4. The coil component according to claim 1, wherein the closure element comprises a softer material than the carrier.

5. The coil component according to claim 1, wherein the closure element includes a chamfer towards the first or second axial end of the closure element.

6. The coil component according to claim 1, wherein the two extension portions project beyond the closure element on a radial side facing away from the winding sections.

7. An electric machine for a motor vehicle drive, comprising a stator and a rotor that is rotatable relative to the stator, and the stator or the rotor comprises the coil component according to claim 1.

8. A coil component for an electric machine, the coil component comprising:
- a carrier having a ring region with multiple grooves distributed in a circumferential direction;
- a coil winding having multiple winding sections received in at least some of the grooves, each of the multiple winding sections being directly contacting at least one radially adjacent winding section of the multiple winding sections;
- an insulation layer arranged between the carrier and the winding sections in at least one groove of the multiple grooves, the insulation layer projects with two extension portions over the winding sections in the at least one groove towards a radial opening of the at least one groove; and
- a closure element received in the at least one groove provided with the insulation layer with a form fit towards the radial opening, and both of the extension portions are configured such that the closure element is spaced apart from the carrier by the extension portions.

9. The coil component according to claim 8, wherein the carrier includes a receiving contour on each circumferential side of the at least one groove and the closure element is pushed into the receiving contours with a respective circumferential flank region thereof, with one of the two extension portions being interposed.

10. The coil component according to claim 8, wherein the at least one groove has a coil receiving space receiving the winding sections, and the groove does not fall below a width of the coil receiving space over an entire radial extension thereof.

11. The coil component according to claim 8, wherein the closure element is comprised of a softer material than the carrier.

12. The coil component according to claim 8, wherein the closure element includes a chamfer towards an axial end.

13. The coil component according to claim 8, wherein the two extension portions project beyond the closure element on a radial side facing away from the winding sections.

14. The coil component according to claim 8, wherein the closure element is holeless from a first axial end of the closure element to a second axial end of the closure element.

15. A coil component for an electric machine, the coil component comprising:
- a carrier having a ring region with multiple grooves distributed in a circumferential direction;
- a coil winding having multiple winding sections received in at least some of the grooves;
- an insulation layer arranged between the carrier and the winding sections in at least one groove of the multiple grooves, the insulation layer projects with two extension portions over the winding sections in the at least one groove towards a radial opening of the at least one groove, wherein the insulation layer includes a U-shaped profile and extends only around a perimeter of the multiple winding sections; and
- a closure element received in the at least one groove provided with the insulation layer with a form fit towards the radial opening, and both of the extension portions are configured such that the closure element is spaced apart from the carrier by the extension portions.

16. The coil component according to claim 15, wherein the insulation layer is holeless from a first end of the insulation layer to a second end of the insulation layer.

17. The coil component according to claim 15, wherein the two extension portions of the insulation layer are connected by a single circumferential portion of the insulation layer disposed radially outwards of each of the multiple winding sections.

18. The coil component according to claim 15, wherein each of the multiple winding sections are directly contacting at least one radially adjacent winding section of the multiple winding sections.

19. The coil component according to claim 15, wherein the closure element is holeless from a first axial end of the closure element to a second axial end of the closure element.

* * * * *